(12) United States Patent
Liu et al.

(10) Patent No.: US 7,359,491 B2
(45) Date of Patent: Apr. 15, 2008

(54) SAVING INFORMATION FROM INFORMATION RETRIEVAL SYSTEMS

(75) Inventors: Jerry Liu, Atlanta, GA (US); William A. Hartselle, Norcross, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 163 days.

(21) Appl. No.: 11/317,541

(22) Filed: Dec. 23, 2005

(65) Prior Publication Data
US 2006/0171511 A1 Aug. 3, 2006

Related U.S. Application Data

(63) Continuation-in-part of application No. 10/852,600, filed on May 24, 2004, now Pat. No. 7,286,653, which is a continuation of application No. 10/112,663, filed on Mar. 29, 2002, now Pat. No. 6,888,930.

(51) Int. Cl.
*H04M 1/64* (2006.01)

(52) U.S. Cl. .................................. 379/68; 379/88.17

(58) Field of Classification Search ............... 379/67.1, 379/68, 84, 85, 88.19, 88.25, 88.27, 202.01, 379/201.01, 114.01, 93.01
See application file for complete search history.

(56) References Cited

U.S. PATENT DOCUMENTS

| | | | |
|---|---|---|---|
| 5,479,491 A | 12/1995 | Herrero Garcia et al. | ..... 379/88 |
| 5,680,443 A | 10/1997 | Kasday et al. | ........... 379/88.13 |
| 5,742,905 A | 4/1998 | Pepe et al. | ................. 455/461 |
| 5,748,709 A | 5/1998 | Sheerin | .................... 379/88.22 |
| 5,797,124 A | 8/1998 | Walsh et al. | ................. 704/275 |
| 5,884,262 A | 3/1999 | Wise et al. | ............... 704/270.1 |
| 5,892,814 A | 4/1999 | Brisebois et al. | ........ 379/88.24 |
| 5,963,626 A | 10/1999 | Nabkel | ........................ 379/142 |

(Continued)

FOREIGN PATENT DOCUMENTS

EP    1051018 A2    11/2000

OTHER PUBLICATIONS

U.S. Appl. No. 10/022,941, filed Dec. 17, 2001, entitled "Method and System for Call, Facsimile and Electronic Message Forwarding", Inventors: Moore et al.

(Continued)

*Primary Examiner*—Olisa Anwah
(74) *Attorney, Agent, or Firm*—Merchant & Gould

(57) ABSTRACT

A method and system for allowing a calling party to save information obtained from an information retrieval system. The caller may select options to save the information to a memory location, e.g., the caller's own network-based voice mail system or a temporary voice mailbox provided for the caller by the information provider, from which the caller can subsequently retrieve and review the information. The information may be saved to an Internet-based website from which the caller may subsequently retrieve the information. The information may be forwarded to a separate telephone directory number for receipt by a third person or for storing on a remote voice mail system. Additionally, the information may be electronically mailed to the caller's electronic mail address for subsequent retrieval. Discussions with a live attendant may be recorded and stored, as audio files or as converted to text, for access by or delivery to the caller.

13 Claims, 5 Drawing Sheets

U.S. PATENT DOCUMENTS

| | | | |
|---|---|---|---|
| 6,049,796 A | 4/2000 | Siitonen et al. | 707/3 |
| 6,078,650 A | 6/2000 | Hansen | 379/52 |
| 6,091,947 A | 7/2000 | Sumner | 455/413 |
| 6,097,941 A | 8/2000 | Helferich | 455/412.1 |
| 6,122,348 A | 9/2000 | French-St. George et al. | 379/88.23 |
| 6,125,376 A | 9/2000 | Klarlund et al. | 715/513 |
| 6,181,780 B1 | 1/2001 | Finnigan | 379/67.1 |
| 6,181,781 B1 | 1/2001 | Porter et al. | 379/88.17 |
| 6,226,362 B1 | 5/2001 | Gerszberg et al. | 379/88.13 |
| 6,233,318 B1 | 5/2001 | Picard et al. | 379/88.17 |
| 6,285,984 B1 | 9/2001 | Speicher | 705/14 |
| 6,292,480 B1 | 9/2001 | May | 370/352 |
| 6,301,608 B1 | 10/2001 | Rochkind | 709/206 |
| 6,332,020 B1 | 12/2001 | Mitchell et al. | 379/93.25 |
| 6,351,523 B1 | 2/2002 | Detlef | 379/88.14 |
| 6,368,205 B1 | 4/2002 | Frank | 455/413 |
| 6,374,223 B1 | 4/2002 | Donaldson et al. | 704/260 |
| 6,446,114 B1 | 9/2002 | Bulfer et al. | 709/206 |
| 6,459,774 B1 | 10/2002 | Ball et al. | 379/67.1 |
| 6,459,785 B1 | 10/2002 | Naumburger | 379/214.01 |
| 6,487,277 B2 | 11/2002 | Beyda et al. | 379/88.01 |
| 6,519,327 B1 | 2/2003 | Cannon et al. | 379/88.22 |
| 6,522,727 B1 | 2/2003 | Jones | 379/88.23 |
| 6,522,879 B2 | 2/2003 | Myer et al. | 455/426.1 |
| 6,529,586 B1 | 3/2003 | Elvins et al. | |
| 6,529,602 B1* | 3/2003 | Walker et al. | 380/283 |
| 6,539,080 B1 | 3/2003 | Bruce et al. | 379/88.17 |
| 6,621,892 B1 | 9/2003 | Banister et al. | 379/88.14 |
| 6,661,879 B1* | 12/2003 | Schwartz et al. | 379/88.25 |
| 6,683,940 B2 | 1/2004 | Contractor | 379/88.17 |
| 6,697,459 B2 | 2/2004 | Finnigan | 379/88.18 |
| 6,718,015 B1 | 4/2004 | Berstis | |
| 6,721,397 B1 | 4/2004 | Lu | 379/88.11 |
| 6,728,934 B1 | 4/2004 | Scopes | |
| 6,744,867 B1 | 6/2004 | Chin et al. | 379/142.01 |
| 6,792,093 B2* | 9/2004 | Barak et al. | 379/202.01 |
| 6,795,530 B1 | 9/2004 | Gilbert et al. | 379/76 |
| 6,801,763 B2 | 10/2004 | Elsey et al. | |
| 6,807,257 B1 | 10/2004 | Kurganov | 379/88.22 |
| 6,829,334 B1 | 12/2004 | Zirngibl et al. | 379/88.17 |
| 6,850,609 B1* | 2/2005 | Schrage | 379/202.01 |
| 6,888,930 B1 | 5/2005 | Hartselle et al. | 379/88.22 |
| 6,940,958 B2 | 9/2005 | Clapper | 379/142.01 |
| 6,987,841 B1* | 1/2006 | Byers et al. | 379/88.17 |
| 6,996,212 B1 | 2/2006 | Baker et al. | |
| 7,046,772 B1 | 5/2006 | Moore et al. | |
| 7,072,452 B1 | 7/2006 | Roberts et al. | |
| 2001/0027097 A1 | 10/2001 | I'Anson | 455/413 |
| 2002/0001369 A1 | 1/2002 | Merwin et al. | 379/67.1 |
| 2002/0031207 A1 | 3/2002 | Lin | 379/88.17 |
| 2002/0069060 A1 | 6/2002 | Cannavo et al. | 704/257 |
| 2002/0077082 A1 | 6/2002 | Cruickshank | 455/413 |
| 2002/0131566 A1 | 9/2002 | Stark et al. | 379/88.19 |
| 2002/0143885 A1 | 10/2002 | Ross, Jr. | 709/207 |
| 2002/0147592 A1 | 10/2002 | Wilmont et al. | 704/270.1 |
| 2002/0159572 A1 | 10/2002 | Fostick | 379/88.14 |
| 2003/0012346 A1* | 1/2003 | Langhart et al. | 379/67.1 |
| 2003/0018720 A1 | 1/2003 | Chang et al. | 709/206 |
| 2003/0039342 A1 | 2/2003 | Yafuso | 379/88.19 |
| 2003/0078035 A1 | 4/2003 | Sheha et al. | 455/414 |
| 2003/0119486 A1 | 6/2003 | Tari et al. | 455/412 |
| 2003/0135647 A1 | 7/2003 | Himmel et al. | 709/245 |
| 2003/0140090 A1 | 7/2003 | Rezvani et al. | 709/203 |
| 2003/0140091 A1 | 7/2003 | Himmel et al. | 709/203 |
| 2003/0142799 A1 | 7/2003 | Candell et al. | 379/88.13 |
| 2003/0169330 A1* | 9/2003 | Ben-Shachar et al. | 348/14.09 |

OTHER PUBLICATIONS

U.S. Appl. No. 10/028,618, filed Dec. 20, 2001, entitled "Delivery of Wireless Messages to Wireline Interactive Devices", Inventors: Simpson.

U.S. Appl. No. 10/109,975, filed Mar. 29, 2002, entitled "Transferring Voice Mail Messages in Text Format", Inventors: Eason.

U.S. Appl. No. 10/178,276, filed Jun. 24, 2002, entitled "Saving and Forwarding Customized Messages", Inventors: Roberts et al.

U.S. Appl. No. 10/180,149, filed Jun. 26, 2002, entitled "Categorization of Messages Saved on a Network-Based Voicemail System", Inventors: Baker et al.

U.S. Appl. No. 10/180,167, filed Jun. 26, 2002, entitled "Voicemail Box with Caller-Specific Storage Folders", Inventors: Baker et al.

U.S. Appl. No. 10/180,261, filed Jun. 26, 2002, entitled "Voicemail System with Subscriber Specific Storage Folders", Inventors: Baker et al.

U.S. Appl. No. 10/184,193, filed Jun. 27, 2002, entitled "Storage of Voicemail Messages at an Alternate Storage Location", Inventors: Baker et al.

Office Action issued on U.S. Appl. No. 10/109,975 filed Aug. 25, 2004.

Office Action issued on U.S. Appl. No. 10/178,276 filed Oct. 1, 2004.

U.S. Official Action dated Jan. 14, 2005 in U.S. Appl. No. 10/180,261.

U.S. Official Action dated Jan. 24, 2005 in U.S. Appl. No. 10/022,941.

U.S. Official Action dated May 4, 2005 in U.S. Appl. No. 10/184,193.

U.S. Official Action dated May 3, 2005 in U.S. Appl. No. 10/109,975.

U.S. Official Action dated May 18, 2005 in U.S. Appl. No. 10/178,276.

U.S. Official Action dated Jul. 14, 2005 in U.S. Appl. No. 10/180,167.

U.S. Official Action dated Jul. 18, 2005 in U.S. Appl. No. 10/180,261.

U.S. Official Action dated Oct. 4, 2005 in U.S. Appl. No. 10/028,618.

U.S. Official Action dated Nov. 4, 2005 in U.S. Appl. No. 10/184,193.

U.S. non-final Office Action dated Mar. 30, 2007 in U.S. Appl. No. 10/852,600.

U.S. Official Action dated Jan. 24, 2007 in U.S. Appl. No. 10/852,600.

U.S. Appl. No. 11/295,002, filed Dec. 6, 2005, entitled "Methods and System for Call, Facsimile and Electronic Message Forwarding".

U.S. Appl. No. 11/441,561, filed May 26, 2006, entitled "Saving and Forwarding Customized Messages".

U.S. Appl. No. 11/295,078, filed Dec. 6, 2005, entitled "Voicemail System with Subscriber Specific Storage Folders".

U.S. Office Action dated Aug. 25, 2005 in U.S. Appl. No. 10/178,276.

U.S. Office Action dated Mar. 15, 2004 in U.S. Appl. No. 10/112,663.

U.S. Office Action dated Oct. 20, 2005 in U.S. Appl. No. 10/852,600.

U.S. Final Office Action dated Jun. 3, 2005 in U.S. Appl. No. 10/022,941.

U.S. Office Action dated Oct. 21, 2003 in U.S. 10/180,261.

U.S. Final Office Action dated Apr. 26, 2004 in U.S. Appl. No. 10/180,261.

U.S. Office Action dated Oct. 17, 2006 in U.S. Appl. No. 10/852,600.

U.S. Final Office Action dated Jun. 30, 2005 in U.S. Appl. No. 10/109,975.

U.S. Final Office Action dated Jul. 12, 2005 in U.S. Appl. No. 10/109,975.
U.S. Final Office Action dated Dec. 6, 2006 in U.S. Appl. No. 10/180,167.
"Procedures for the Transfer of Facsimile Data Via Store-and-Forward on the Internet" T.37 (Jun. 1998).
"Full Mode" T.37 (1998) Amendment 1 (Sep. 1999).
"Replacement of Reference RFC 2531 by RFC 2879" T37 (1998) Amendment 2 (Mar. 2001).
"Support of Image/Tiff and Image/Tiff-Fx MIME Content-Types" T.37 (1998) Amendment 3 (Nov. 2002).
U.S. Non-final Official Action dated Oct. 17, 2006 in U.S. Appl. No. 10/852,600.
U.S. Official Action dated Jul. 14, 2006 in U.S. Appl. No. 10/109,975.
U.S. Official Action dated Jul. 11, 2006 in U.S. Appl. No. 10/180,167.
U.S. Official Action dated May 22, 2006 in U.S. Appl. No. 10/028,618.
U.S. Official Action dated Apr. 20, 2006 in U.S. Appl. No. 10/852,600.
U.S. Official Action dated Jan. 11, 2006 in U.S. Appl. No. 10/180,167.
U.S. Official Action dated Dec. 16, 2005 in U.S. Appl. No. 10/109,975.
U.S. Official Action dated Jun. 27, 2007 in U.S. Appl. No. 11/441,561.

* cited by examiner

SAVING INFORMATION FROM INFORMATION RETRIEVAL SYSTEMS

CROSS-REFERENCE TO RELATED APPLICATION

This is a continuation-in-part of application Ser. No. 10/852,600 filed May 24, 2004 now U.S. Pat. No. 7,286,653; which is in turn a continuation of application Ser. No. 10/112,663 filed Mar. 29, 2002 now U.S. Pat. No. 6,888,930.

FIELD OF THE INVENTION

This invention relates to a method system for allowing a calling party to save for subsequent review information obtained from information retrieval systems.

BACKGROUND OF THE INVENTION

In the modern telecommunications environment, people have grown accustomed to receiving information from interactive information retrieval systems. For example, a person may have an appointment with a physician, but lacks information as to the driving directions to the physician's office. Upon calling the physician's office to obtain directions to the physician's office, the calling party most often is connected to a recorded information retrieval system that provides the calling party with a variety of types of information in response to selections from the calling party. For example, the system may instruct the calling party to "press '1' to hear the operating hours of the physician's office; press '2' to receive driving instructions to the physician's office; press '3' for appointments; or press '4' to speak with an attendant." If the calling party selects the driving instructions option, for example, the driving instructions to the physician's office are typically played to the calling party over the calling party's telephone. Unfortunately, if the calling party is calling the physician's office from a wireless telephone while driving to the physician's office, the calling party may have difficulty in memorizing the driving instructions, and moreover, the calling party may have even more difficulty trying to obtain something in her vehicle for writing down the instructions as the instructions are being played over the wireless telephone and while the calling party is driving. Typically, in such a situation, in the interest of safety and in the interest of obtaining the full content of the driving instructions, the calling party must disconnect the call, pull off the road, obtain paper and pen, redial the physician's office, and write the driving instructions the next time the calling party receives the instructions. Other examples include calling a movie theater only to receive a fast-paced recording of the movies and times of presentation while the calling party scrambles to locate paper and pen to write down the relevant information so that the calling party does not have to call the recorded information system a second time.

Likewise, calling parties often desire to call information retrieval systems that provide general information on a variety of topics. For example, information retrieval systems are available that allow calling parties to dial in to ask for information on a wide range of topics, for example, sports information updates, medical information, and commercial offerings in a certain area, such as food, entertainment, driving directions and the like. For example, a calling party may dial into an information retrieval system, select a driving instructions function, and then provide the interactive information retrieval system with the "from" location and the "to" location to obtain driving directions from the calling party's present location to a desired location. As with the previously described situations, the information retrieved may be lengthy and may be difficult for the calling party to absorb without writing the information for subsequent review.

Furthermore, interactive voice response and information retrieval systems sometimes make a live attendant or operator available to callers. A caller in such cases may reach the live attendant either after first navigating through one or several branches of an automated attendant, or when the live attendant answers the call. In either case, the caller would benefit from the ability to have a record of the conversation available for retrieval after concluding the call, without attempting to take notes while listening to the live attendant and perhaps considering a response or follow-on question for the attendant. The benefit of freedom from note-taking may be even more important to a caller during a live conversation with an attendant, as a typical live conversation lacks the structure of automated-attendant calls and may produce narrative responses that would require accurate and detailed note-taking, instead of eliciting relatively predictable or concise information such as the starting times of shows or the like. Providers of live-attendant information systems would also benefit from providing a user-retrievable record of live conversations, because user access to the record of a call can reduce the number of callbacks requesting information given during a previous discussion but not remembered or written down by the caller.

Accordingly, there is a need in the art for a method and system for allowing a calling party to save information obtained from information retrieval systems to a memory location that may be subsequently accessed by the calling party for additional review of the saved information at the convenience of the calling party. It is with respect to these and other considerations that the present invention has been made.

SUMMARY OF THE INVENTION

In accordance with the present invention, the above and other problems are solved by a method and system for allowing a calling party to save for subsequent retrieval and review information obtained from an information retrieval system. A calling party places a call to either an interactive voice information retrieval system or to a telephone directory number that is associated with a telecommunications network-based voice mail system that provides interactive information to calling parties. The call is either routed directly to the general information retrieval system or via the telecommunications network to the network-based voice mail system. Once the calling party receives desired information, the calling party may select a number of options to save the information to a memory location from which the calling party may subsequently retrieve and review the information. The information may be sent to and stored at the calling party's own network-based voice mail system, or the calling party may have the information sent to and stored at a temporary voice mail box provided by the information provider. The information may be saved to an Internet-based website from which the calling party may subsequently retrieve the information. The information may be forwarded to a separate telephone directory number for receipt by a third person or for storing on a remote voice mail system. Additionally, the information may be electronically mailed to the calling party's electronic mail address for subsequent retrieval.

Further in accordance with the present invention, the calling party may choose to have the system record a session with a live operator or attendant after placing an information call either via a general information retrieval system or a network-based voicemail system. If the caller chooses to record the conversation for subsequent access, the live attendant prompts the caller to choose delivery options for subsequent access to the resulting record of the call. These delivery options may include delivery by email to a default email address previously established for the caller or to another email address specified by the caller. Other delivery options according to the disclosed embodiment include delivery by voicemail to the caller, and delivery to a Web address accessible to the caller. The caller is also presented with the option to receive the record of the call either as an audio file or as converted to text via voice-to-text automated conversion. After the conversation with the live attendant ends, the caller may access the record of the call to play back or otherwise review the recorded discussion with the live operator. The recording may also be initiated by the calling party instead of the live attendant, according to the disclosed embodiment.

These and other features and advantages, which characterize the present invention, will be apparent from a reading of the following detailed description and a review of the associated drawings. It is to be understood that the forgoing general description and the following detailed description are exemplary and explanatory only and are not restrictive of the invention as claimed.

DETAILED DESCRIPTION

Figure 1:
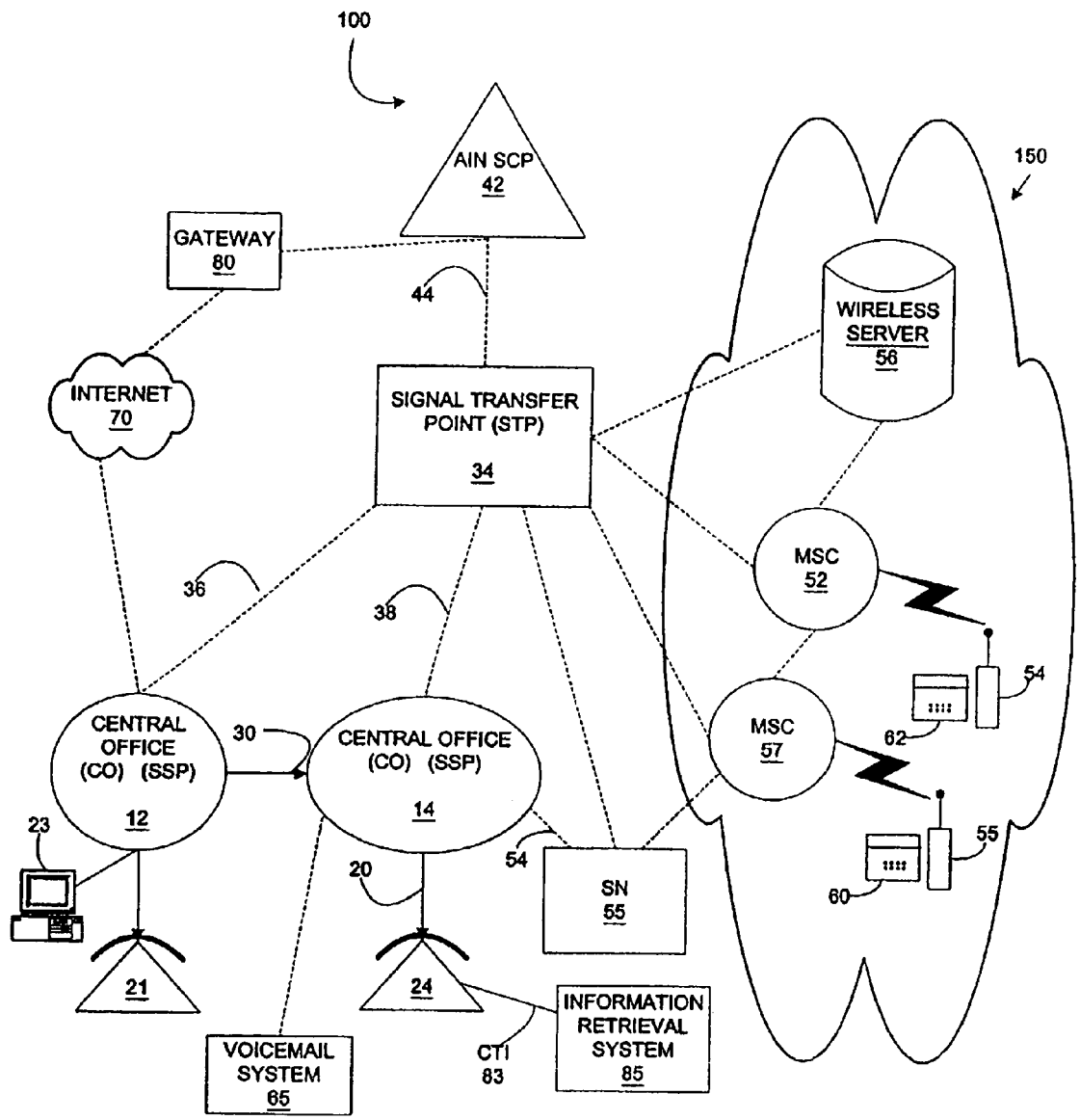
FIG. 1 is a block diagram illustrating components of a wireline and wireless telecommunications network that provides an operating environment for the present invention.

The following description of an embodiment of the present invention is made with reference to the above-described drawings wherein like numerals refer to like parts or components throughout the several figures. The present invention is directed to a method and system for allowing a calling party to save for subsequent retrieval and review information obtained from an information retrieval system. According to an embodiment of the present invention, a calling party places a call to either an interactive voice information retrieval system or to a telephone directory number that is associated with a telecommunications network based voice mail system that provides interactive information to calling parties. For example, a calling party may call a general information retrieval system to which various companies, marketers or service providers subscribe to provide general information to calling parties. Alternatively, a calling party may call directly to a business or other service provider, and the call may be routed to a network-based voice mail system that provides for interactive information retrievals.

After the calling party places the call to either the general information retrieval system or directly to the telephone directory number associated with a network-based voice mail system, the call is either routed directly to the general information retrieval system or via the telecommunications network to the network-based voice mail system. Once the calling party is connected to either type of information retrieval system, and the calling party identifies the information the calling party desires, the calling party may simply listen to the information in a conventional fashion over the handset of the calling party's telephone, or the calling party may select a number of options to save the information to a memory location from which the calling party may subsequently retrieve and review the saved information at the calling party's convenience.

According to an embodiment of the present invention, a calling party may have the information sent to and stored at the calling party's own network-based voice mail system, or the calling party may have the information sent to and stored at a temporary voice mail box provided by the information provider. Alternatively, the calling party may have the information saved to a general information retrieval Internet-based website from which the calling party may subsequently download and review the saved information. Alternatively, the calling party may have the information forwarded to a separate telephone directory number for receipt by a third person or for storing on a remote voice mail system. Additionally, the calling party may have the information electronically mailed to the calling party's electronic mail address for subsequent review.

Advantageously, according to embodiments of the present invention, the calling party may obtain useful information from a general information retrieval system or from a voice mail based information system and have that information saved to a designated memory location from which the calling party may later retrieve the information in a convenient and safe manner. With this system, the calling party may review the information as many times as the calling party likes without the need for redialing and connecting to the information retrieval source each time the calling party desires to review the information.

Operating Environment

FIG. 1 is a block diagram illustrating components of a wireline and wireless telephone network that provides an exemplary operating environment for the present invention. The public switched telephone network that evolved in the 1980s incorporated the advanced intelligent network (AIN). Some of the components of the advanced intelligent network are illustrated in FIG. 1. FIG. 1 is illustrative of at least a part of the advanced intelligent network (AIN) 100 of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 1, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line 18. The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN 100 are provided by regional STPs (not shown) and regional SCPs (not shown). The STP 34 is connected to the SSPs via connections 36, 38 and 40. Both the regional SCPs and the local SCP 42, which represent a plurality of local SCPs distributed throughout the AIN 100, are connected via respective data links to the SMS 46. The SMS 46 provides a centralized platform for remotely programming the various SCPs of the AIN 100 so that a coordinated information processing scheme may be implemented for the AIN 100.

The modern Advanced Intelligent Network 100 also includes service nodes (SN) such as service node 55 shown in FIG. 1. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 54 to SSP 12, ISDN/SS7 protocol conversion in SSP 12, and SS7 links 38 and 44. According to a preferred embodiment, the ISDN links 54 serve as a primary rate interface (PRI) over which services may be provided to subscribers using wireline services such as the wireline telephone sets 21 and 24 and subscribers using wireless services such as the wireless units 54, 55, 60, and 62.

The voice mail system 65 is shown in FIG. 1 being functionally connected to the switch 14 and is a component of the network 100. That is, calls are routed to and from the voice mail system 65 at the control and direction of the network 100 via such components as the SCP 42. The voice mail system 65 typically includes a computer or collection of computers, recording and recording playback devices, and software for recording announcements for incoming calls, recording and playing back recorded messages, and for receiving incoming calls and for making outgoing calls at the direction of the network 100. In addition to the recording and playback functionality, the voicemail system 65 includes text-to-speech voice synthesis devices and software for conversion of analog voice messages to digitized forms such as WAV files and MP3 files. The voice mail system 65 has memory capacity for saving announcements to incoming callers and for saving messages from incoming callers. The computing system of the voicemail system 65 may send and receive electronic mail via the network 100 and the Internet 70.

In accordance with the present invention, subscribers to voice mail services of the service provider of the network 100 may use the voicemail system 65 as a network-based information retrieval system for their customers or other incoming callers. For example, a physician's office may set up a voice mail greeting in the voicemail system 65 that provides callers with a variety of selections with each selection providing different information, such as driving instructions or operating hours. According to an embodiment of the invention, the calling party may direct the voicemail system 65 to save information to a memory location at the voice mail system 65, or the voice mail system may send that information to a remote storage location via the network 100 to a forwarding telephone directory number, or via the Internet to a website or electronic mail address.

The information retrieval system (IRS) 85 is similar to the voice mail system 65 except that the IRS 85 is independent of the network 100. The IRS 85 is reached by an incoming caller by dialing the telephone directory number of the IRS 85 as a terminating piece of premises equipment. As illustrated in FIG. 1, the IRS 85 is connected to a telephone 24 via a computer telephony interface, described below. Unlike the voicemail system 65, calls routed to and from the IRS 85 are not controlled by the network 100, except to the extent that calls to and from the telephone 24, to which the IRS 85 is connected, are controlled by the network 100. Typically, the IRS 85 is operated by a third party to the network 100 for providing information to callers on a variety of subjects.

For example, a caller may call the IRS 85 and seek information on sports, shopping, weather, commercial listings, and the like.

Like the voice mail system 65, the IRS 85 typically includes a computer or collection of computers, recording and recording playback devices, and software for recording announcements for incoming calls, recording and playing back recorded messages, and for receiving incoming calls and for making outgoing calls at the direction of the network 100. In addition to the recording and playback functionality, the IRS 85 includes text-to-speech voice synthesis devices and software for conversion of analog voice messages to digitized forms such as WAV files and MP3 files. The IRS 85 has memory capacity for saving announcements to incoming callers and for saving messages from incoming callers. The computing system of the IRS 85 may send and receive electronic mail via the network 100 and the Internet 70. According to an embodiment of the invention, the calling party may direct the IRS 85 to send saved information to the caller's network-based voice mail box at the voice mail system 65. The IRS may save information for the caller at a temporary memory location at the IRS 85. The IRS 85 may send saved information to a remote storage location via the network 100 to a forwarding telephone directory number, or via the Internet to a website or electronic mail address.

A computer telephony interface 83 serves as an interface between the called party's telephone 24 and the information retrieval system (IRS) 85. Computer telephone integration, as facilitated by the computer telephony interface (CTI) 83, is a process for integration of a telephone system with a computing system. For example, the CTI 83 may be used for allowing computer applications to answer incoming calls, provide database information on a computer screen at the same time the call comes in, automatically route and reroute calls, automatically dial and speed dial outgoing calls from a computer resident database and identify incoming customer calls and transfer them to predetermined destinations based on calling party identification received on the incoming telephone call. According to the present invention, the CTI 83 serves as an interface between the called party's telephone 24 and the IRS 85 for linking information provided by the IRS 85 to an incoming telephone call.

The computer telephony interface 83 may be a software application program resident on the called party telephone 24 for passing information such as calling party identification information on a calling party to the IRS 85. Alternatively, the computer telephony interface 83 may also include a software application program resident on the IRS 85 for receiving and acting upon information received from the called party telephone 24 such as requests for information from the calling party.

The Internet 70 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 70 and the TCP/IP transmission protocols is well known to those skilled in the art. The gateway 80 provides access to the Internet 70 by the other components of the telecommunications network illustrated in FIG. 1. As is well known to those skilled in the art, a gateway may provide a number of functions including connectivity between incompatible communications networks.

In operation, the intelligent network elements of the AIN 100, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

The wireless network 150, such as a cellular network, comprises a mobile switching center (MSC) 52. The MSC 52 is a switch providing services and coordination between wireless users in the network 150 and external networks. The MSC 52 may be connected to the STP 34 to provide information to the wireline network 100 and receive information from the wireline network. The MSC 52 also communicates with a wireless subscriber, such as wireless telephones 54 and 55.

The wireless server 56 is a computer or collection of computers for handling a variety of call processing features provided for the wireless components of the wireless network 150. In accordance with the present invention, the wireless server 56 contains software functionality for receiving and implementing instructions for receiving wireless messages in the form of saved information retrieved from an information retrieval system and forwarded to or electronically mailed to wireless devices, such as wireless telephones 54, 55 and wireless personal digital assistants 60, 62. For example, if in accordance with the present invention a calling party desires to electronically mail saved information, such as driving instructions, to her personal digital assistant 60, the electronic mail may be routed through the wireless server 56 via the Internet 70 and SCP 42. In this case, the wireless server performs the functions of a typical electronic mail server for receiving message traffic, handling translations and addresses for sending e-mail to the wireless devices 60, 62 and for sending the e-mail to those devices.

Operation

Figure 2:
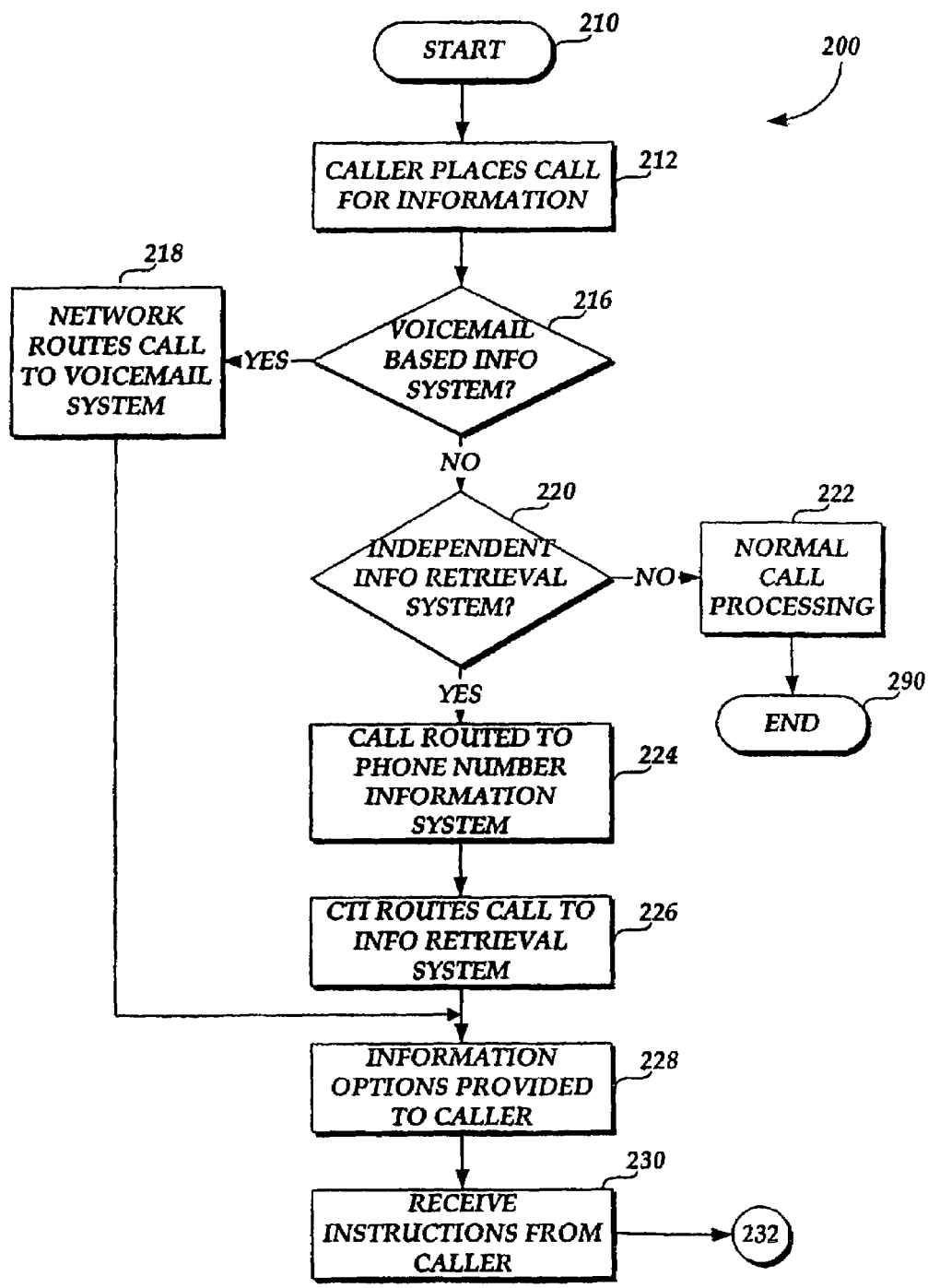
FIGS. 2-4 illustrates a logical flow of the steps performed by a method and system of the present invention for allowing a calling party to access and save for subsequent review information received from an information retrieval system.

Having described an operating environment for the present invention with reference to FIG. 1, FIGS. 2-4 illustrate the logical flow of the steps performed by a method and system of the present invention for allowing a calling party to save information obtained from an information retrieval system to a designated memory location from which the calling party may subsequently retrieve and review the saved information. Referring to FIG. 2, the method 200 begins at start step 210 and proceeds to step 212 where a calling party places a call to obtain information on a given subject. For example, a calling party may be calling the telephone directory number of the calling party's physician to obtain driving directions to the physician's office. Alternatively, the calling party may be calling a general information number from which the calling party would like to obtain information on local movie theater show listings.

At step 216, if the calling party dials the direct telephone directory number of a business or organization that utilizes a network-based voice mail information system, the method proceeds to step 218, and the telecommunications network 100 attempts to connect the calling party to the subscriber line associated with the telephone directory number according to normal call processing. Referring to FIG. 1, the calling party calls from her telephone set 21 through her central office switch 12 to a subscriber line 20 associated with the telephone directory number dialed by the calling party. For example, if the subscriber line 20 is associated with the calling party's physician's office, according to normal call processing, a trunk line 30 is opened between the switch 12 of the calling party and the switch 14 of the called party (for example, the calling party's physician's office) and the call is connected. However, according to the present invention, if the called party (e.g. calling party's physician's office) has subscribed to a network-based voice mail information system, the call is forwarded to the voice mail system 65 to provide interactive information to the calling party.

In accordance with intelligent network operations, the described call routing is accomplished by provisioning a termination attempt trigger (TAT) on the called party's switch 14. When the call from the calling party is directed to the called party's switch 14, the termination attempt trigger causes a query to the service control point 42 that, in turn, performs a services look-up to determine whether any special services have been subscribed to by the called party. According to the present invention, the service control point look-up determines that the called party has subscribed to an interactive voice mail information retrieval service according to the present invention. Once the call is routed to the voice mail system 65, as described, the method proceeds to step 228, described in detail below.

Referring back to step 216, if the calling party does not dial a directory number associated with a called party that has subscribed to a network-based voice mail information system, the method proceeds to step 220. At step 220, a determination is made as to whether the calling party has dialed the telephone directory number of a third party information retrieval system, as described above. If not, the method proceeds to step 222, and the call is processed according to normal call processing and the method ends at step 290. That is, if the call is not directed to either a telephone directory number associated with a network-based voice mail information retrieval system or to a third party information retrieval system, the call is routed to the subscriber line associated with the telephone directory number dialed by the calling party at which point the call is either answered by the called party, not answered by the called party, forwarded by the called party, or the call may be directed to the called party's voice mail system or local voice mail machine.

If at step 220 a determination is made that the call is directed to a third party information retrieval system at the IRS 85, such as a system operated for providing general marketing or public service information about its subscribers to calling parties, the method proceeds to step 224, and the call is routed to the telephone directory number associated with the information retrieval system 85. For example, at step 224, the calling party using her telephone set 21 dials the telephone directory number of an information retrieval system operated off the subscriber line 20 connecting the telephone set 24 to the central office 14. In contrast to the call processing discussed with reference to the network-based voice mail system, described above, the present call does not encounter a termination attempt trigger at the called party's switch 14 to cause the telephone network 100 to route the telephone call to a network-based voice mail system. In this case, the call is routed directly to the subscriber line 20 and to the telephone set 24 associated with the telephone directory number dialed by the calling party and associated with the information retrieval company to which the call is directed.

When the call reaches the telephone 24, at step 226, the computer telephony interface 83 between the called party's telephone 24 and the information retrieval system 85 allows the calling party's call to be directed to the computing system and information retrieval functionality of the information retrieval system 85, described with reference to FIG. 1. Once the calling party is connected to the information retrieval system 85 via the computer telephony interface 83, the calling party may now obtain information on a variety of topics from the information retrieval system. For example, the calling party may be provided with prompts such as "for information on a given topic, speak the topic into your hand set." Using the voice activated responses or keypad entries prompted by the information retrieval system 85, the calling party narrows her information query to find information on a specific topic of interest, for example, local movie show listings or driving directions.

At step 228, whether the call was directed to the networked-based voice mail system described with reference to step 218, or to the non network-based information retrieval system described with reference to steps 224 and 226, information options are provided to the calling party. For example, once the calling party has identified the particular information the calling party would like to hear, such as driving directions, movie show listings, sports information and the like, the calling party is provided with options for listening to the selected information and/or saving the information to a designated memory location for subsequent retrieval and review by the calling party.

According to an embodiment of the present invention, the calling party may be provided a series of prompts from either the voice mail system 65 according to the network-based embodiment or from the general information retrieval system 85 through the computer telephony interface 83 according to the non network-based system. For example, the calling party may be prompted to "press or say 'I' if the calling party would like to save the information to a designated memory location." If the calling party selects this option, the calling party may then be given the option of saving the information to the calling party's voice mailbox operated via the voice mail system 65. Alternatively, if the calling party does not have a voice mailbox operated by the voice mail system 65, the calling party may be provided the option of saving the information to a temporary voice mailbox at the voice mail system 65. Alternatively, the calling party may be provided the option of saving the information to an Internet-based website from which the calling party may subsequently retrieve and review the information.

According to another embodiment, the calling party may be provided the option of forwarding the information to a third party telephone directory number to be received by a third party or to be saved at a voice mail system associated with the forwarding number. Alternatively, the calling party may be provided the option of having the information electronically mailed to the calling party at an e-mail address designated by the calling party. For all the options provided to the calling party, the calling party may also be provided the option of having the information saved only without hearing the information played to the calling party, or the calling party may be provided the option of having the information played to the calling party in the normal fashion over the calling party's telephone handset followed by saving the information according to the calling party's selected saving option.

Figure 3:
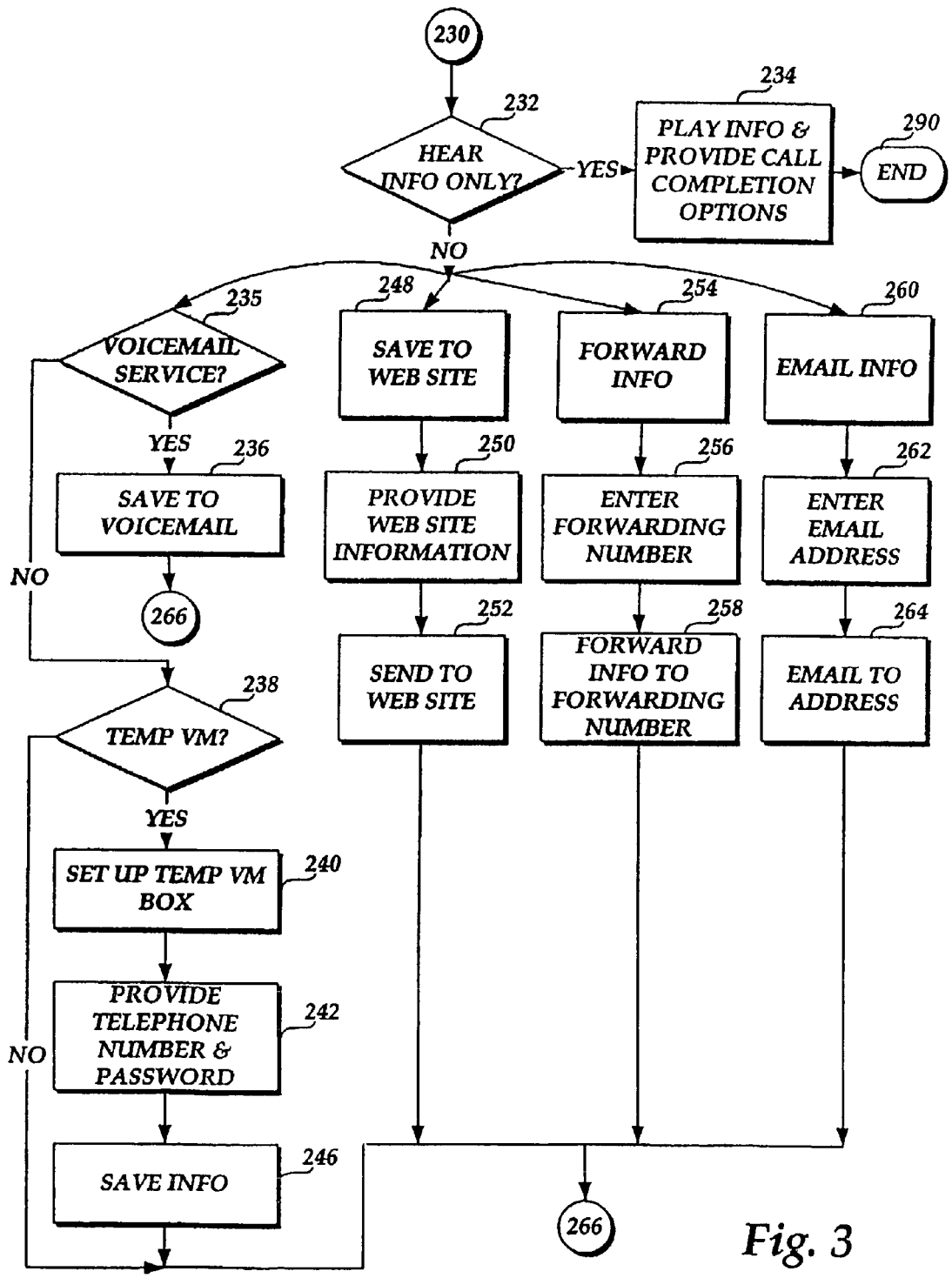

At step 230, the voice mail system 65 according to the network-based embodiment or the general information retrieval system 85 according to the non network-based embodiment receives the options and instructions from the calling party as to the desired disposition of the information to be provided to the calling party. Referring to FIG. 3, at step 232, if the calling party has selected to hear the information only and not to have the information saved to a designated memory location, the method proceeds to step 234 and the information is played to the calling party followed by a presentation of call completion options to the calling party. That is, after the information is played to the calling party, the calling party may be provided other options such as "if you desire additional information, please stay on the line for an attendant," or "if you would like to hear this information again, please press 1." The method then ends at step 290.

If at step 232 the calling party has selected one of the above-described information saving options, the method proceeds to steps 236, 248, 254 or 260 according to the options selected by the calling party. If the calling party decides to save the information to her voice mailbox, the method proceeds to step 235, and a determination is made as to whether the calling party has a voice mailbox in the voice mail system 65 of the telecommunications system 100. This determination is made based on the telephone directory number of the calling party. During the initial query to the SCP 42 to determine that the calling party's call should be directed to the voice mail system 65, the SCP 42 may determine that the telephone directory number of the calling party is associated with a voice mailbox in the voice mail system 65 of the telecommunications network.

If the calling party does have a voice mailbox in the voice mail system 65, the method proceeds to step 236, and the information designated by the calling party is saved in the calling party's network-based voice mailbox at the voice mail system 65. If the information to be saved is coming from the voice mail system 65 as is the case with the network-based voice mail information retrieval, described above, the information may simply be routed from the voice mailbox of the called party (e.g., physician's office) directly to the voice mailbox of the calling party both at the voice mail system 65. However, if the information to be saved is coming from the non network-based information retrieval system 85 operated by a third party outside the telecommunications network 100, the information must be routed to the calling party's voice mailbox at the voice mail system 65.

In order to properly route the information, the information retrieval system 85 prompts the calling party at step 236 to provide it with the calling party's telephone directory number that is associated with her voice mailbox at the voice mail system 65. Based on that information, the information retrieval system 85 may then place a call to the telephone directory number of the calling party in order to deposit the saved information in the calling party's voice mailbox at the voice mail system 65. Once the information designated for saving by the calling party is saved in the voice mail system 65, the voice mail may be sent directly to the calling party to allow the calling party to listen to the voice mail, or the system may alert the calling party with a standard message waiting indicator signal, such as a flashing light at her telephone 21 or a tone heard over the speaker of her telephone.

If at step 235, a determination is made that the calling party does not have a voice mailbox at the voice mail system 65, the method proceeds to step 238, and a determination is made as to whether the calling party desires that the information be saved to a temporary voice mailbox. That is, a prompt may be provided to the calling party under either the network-based voice mail system embodiment or under the non network-based information retrieval system embodiment to ask the calling party whether the calling party would like to have the information saved in a temporary mailbox. If at step 238, the calling party elects to have the information saved in a temporary voice mailbox, the method proceeds to step 240 and a memory location is set aside at the voice mail system 65 or at the information retrieval system 85 for saving the information for the calling party. At step 242, the calling party is prompted with a temporary telephone number and password for dialing into the temporary voice mailbox for retrieving the saved information. At step 246, the information designated for saving by the calling party is saved to the temporary voice mailbox. Information saved to the temporary voice mailbox may be saved for some specified period of time, such as one hour or one day, according to the arrangement agreed to by the calling party. For example, when the calling party is prompted to set up the temporary voice mailbox, the calling party may be able to select the amount of time the temporary mailbox is maintained by paying a varying amount of fee.

Figure 4:
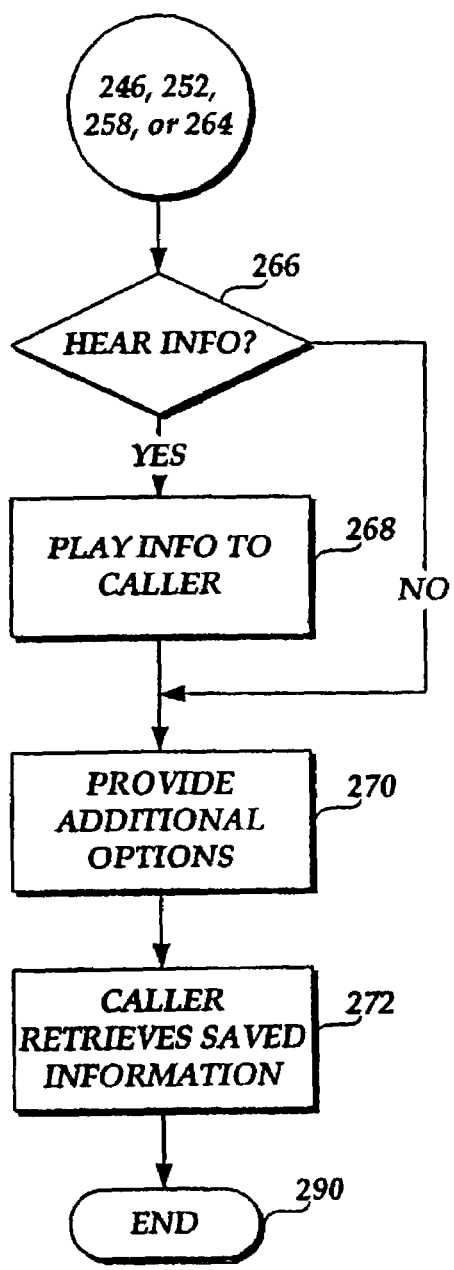

Referring to FIG. 4, after the information is saved at either the permanent voice mailbox, described with respect to step 236, or at the temporary voice mailbox, the method proceeds to step 266, and a determination is made as to whether the calling party desires to hear this information over the calling party's telephone 21. If the calling party does desire to hear the information, the method proceeds to step 268 and the information is played to the calling party. If not, the method proceeds directly to step 270, and the calling party is provided with any additional available options, for example, hearing the information again, holding for an attendant, and the like. The method then proceeds to step 272 where the calling party may dial into the voice mailbox or temporary voice mailbox to retrieve the saved information at the calling party's convenience. The method ends at step 290.

Referring back to step 232, if the calling party decides to save the information to an information retrieval website, the method proceeds to step 248. According to this embodiment of the present invention, a general information retrieval website may be set up via the Internet 70 and gateway 80, as illustrated in FIG. 1. At step 248, if the calling party elects to save the information to the information retrieval website, the method proceeds to step 250, and the calling party is provided a prompt giving the calling party website information, such as the website address and a password for retrieving saved information from the website. At step 252, the saved information is forwarded to the information retrieval website. Prior to sending the saved information to the information retrieval website, the voice mail system 65 or information retrieval system 85 first converts the saved voice information into a digitized audio format such as WAV or MP3. The digitized audio formatted version of the saved information is then sent to the website from which the calling party may download the audio file to listen to the saved information.

If the information is being saved from the network-based voice mail system 65, the information is routed back through the central office 14 and data lines 38 and 42 to the SCP 42. The information is then routed from the SCP 42 through the gateway 80 to the Internet 70 and to the information retrieval website. If the information is being saved from the third party information retrieval system 85, the information is submitted directly from the information retrieval system 85 via the Internet 70 to the information retrieval website. The method then proceeds to step 266, and processing continues for steps 266 through step 270, as described above. At step 272, the calling party may retrieve the saved information by logging on to the information retrieval website from the calling party's computer 23. Once the calling party connects to the information retrieval website, the calling party may use the password to access, review, download or listen to the stored information.

Referring back to step 232, if the calling party elects to forward the information to a forwarding number, the method proceeds to step 254 and the calling party responds to a prompt indicating that the calling party desires to forward the information to a forwarding telephone directory number. The calling party may desire to forward the information to a third person who needs the information for some purpose, or the calling party may desire to send the information to the calling party's home telephone directory number, for example, and have the information played to a home based voice mail machine.

At step 256, the calling party is prompted to enter a forwarding telephone directory number. At step 258, the information is forwarded to the forwarding telephone number. In order to forward the information to the forwarding telephone directory number, the voice mail system 65 or the information retrieval system 85 places a call to the forwarding telephone directory number according to normal call processing procedures. If the forwarding telephone directory number is answered, or if a voice mail machine or voice mail system answers at the forwarding telephone directory number, the information designated for saving by the calling party is played either to the person answering the forwarding telephone directory number or to the voice mail machine or voice mail system answering the call. The method then proceeds to step 266 and is processed as described above for steps 266 through 270. At step 272, the calling party may retrieve the information from the third party answering the forwarding telephone directory number, or from the voice mail machine or voice mail system answering at the forwarding telephone directory number.

Referring back to step 232, if the calling party elects to have the information electronically mailed to the calling party at a designated e-mail address, the method proceeds to step 260. At step 260, if the calling party has elected to have the information e-mailed to the calling party's e-mail address, the method proceeds to step 262, and the calling party is prompted to enter an e-mail address. If the calling party is a subscriber to the telecommunications system under which the voice mail system 65 operates, the calling party may have previously stored her e-mail address with a customer profile with her telecommunications service provider so that the voice mail system 65 may access the e-mail address of the calling party from the SCP 42. Alternatively, the calling party may enter an electronic mail address via a voice recognition system operated by either the voice mail system 65 or the information retrieval system 85. Alternatively, according to another alternative, if the calling party desires to use the services of the information retrieval system 85 on a regular basis, or of the voice mail system 65 via her telecommunications service provider, the calling party may provide her electronic mail address to both entities prior to using the information retrieval functionality.

At step 264, the information designated for saving by the calling party is converted by either the voice mail system 65 or the information retrieval system 85 into a digitized form such as WAV or MP3. The digitized audio formatted versions of the saved information are then electronically mailed to the electronic mail address provided by the calling party. The method then proceeds to step 266, and processing continues for steps 266 through 270, as described above. At step 272, the calling party may retrieve the saved information via her electronic mail system. The method ends at step 290.

Figure 5:
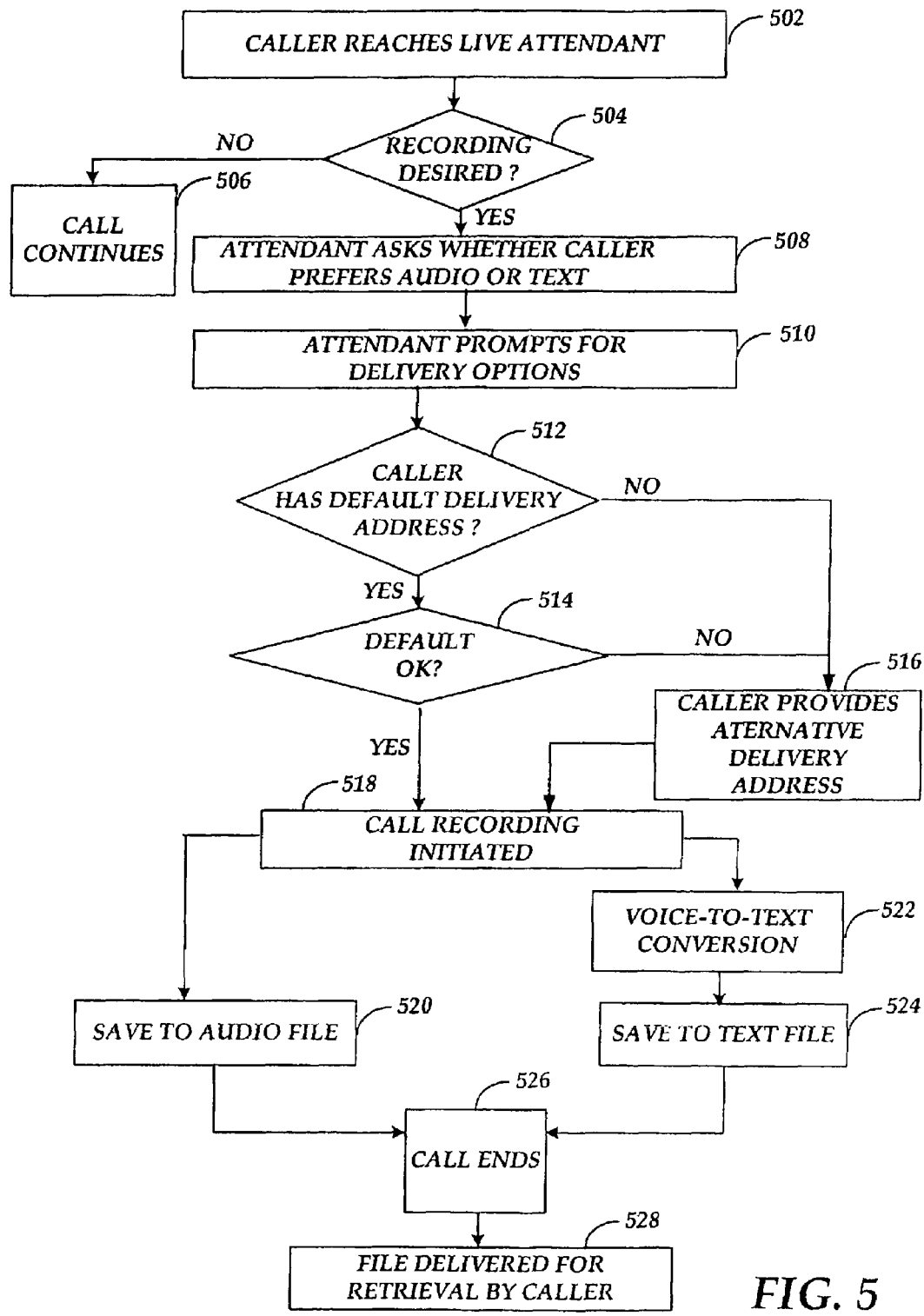
FIG. 5 illustrates a logical flow performed by a method and system according to another disclosed embodiment of the present invention, for allowing recording and subsequent access of a session between a calling party and a live attendant.

FIG. 5 illustrates logic flow for recording a conversation between a caller and a live attendant or operator, according to another disclosed embodiment of the present invention. The method and system embodying the operations shown and described with respect to FIG. 5 may incorporate the operating environment described above with regard to FIG. 1. In addition, as will become apparent below, the voice-recording embodiment preferably includes a capability of performing automated voice-to-text conversion, that is, a computer-implemented output of text based on speech input. The voice-to-text capability for the embodiment of FIGS. 5 and 6 is implemented, for example, in the voicemail system 65 or the information retrieval system 85 shown in FIG. 1. Voice-to-text conversion software is known to those skilled in the art and need not be described in detail herein.

The embodiment shown in FIG. 5 commences when a caller at 502 reaches a live attendant after placing a call seeking information from an information retrieval system. The caller may reach that live attendant only after navigating through one or more levels of an automated attendant system, or in the alternative may reach the live attendant when the call is answered. In any case, that call may have been placed either through a voicemail-based system as shown at 216 in FIG. 2, or through an independent information retrieval system as at 220 in that figure. Whatever the routing of the information-seeking call, the method and system described with respect to FIG. 5 assumes that the caller has now reached a live attendant, who asks at 504 whether the caller wants a recording made of the call. If a caller answers in the negative, then the call proceeds in the usual manner without any recording as shown at 506.

Assuming the caller tells the live attendant at 504 that recording the call is desired, the attendant at 508 tells the caller that the resultant recording may be made available to the caller either as an audio (i.e., voice recording) file or as converted to a text file (e.g., by an automated voice-to-text conversion).

The live attendant at 510 also prompts the caller for at least one delivery option, for example, whether the caller prefers to access the call record (either audio or converted text) by email or by accessing a Website. After the caller tells the live attendant which kind of record and manner of delivery are preferred, the attendant at 512 determines whether the caller has a default address for the requested mode of delivery. The default may be, for example, the caller's email address obtained when the caller first opened an account. If the caller indicates delivery of a voice recording by email, then this email address may be a likely default address for delivering the record of the call. For applications where the caller is a subscriber to the called source of information or has otherwise previously established an email address or an Internet web site preference with the source of information, that default information may appear on a display screen available to the live attendant while the call is in progress. For example, that information could be made available to the live attendant in response to the directory number of the caller, or in response to an account number or other identification given by the caller earlier during the information caller in progress.

If the caller lacks a default delivery address, or if the caller at 514 prefers delivery of the record to an address other then the default one, the process branches at 516 and the attendant requests the caller to give an alternatively delivery address. Once the live attendant knows the caller's preferences with respect to the modes of recording and delivery, then at 518 the attendant initiates recording of the call. Calling initiation may be through an operator-actuated key or keystroke operative to initiate the voice-recording aspect of the voicemail system 65 or the information retrieval system 85, as previously stated. If the caller previously requested making available the call record as an audio file, the system as shown at 520 records the conversation in an audio file using an appropriate format for file storage and subsequent access. If the caller previously requested a text-base record of the conversation, then at 522 a voice-to-text conversion of the conversation is generated as described above. The voice-to-text conversion may be made on-the-fly while the call is in progress, or in the alternative may be generated from a recorded audio file after the call is completed. The resulting text generation is saved to a text file at 524 in a format suitable for storing, emailing, and subsequent access by the caller, for example via a web site.

The recording terminates either when the call ends at 526, or under control of the live operator. Once the call ends, the audio file or text file is completed and saved for delivery, either to the email or voicemail (audio only) address previously indicated by the caller or to a Web address according to the caller's request. The caller at 528 may then access and retrieve a record of the conversation with the live operator, either as an email message delivered to the caller or by logging onto the Website as previously selected. Customary login procedures for accessing the caller's email account or the Website may be employed as understood by those skilled in the art, to prevent unauthorized third-party access to the delivered record of the call. If the message is delivered in an audio format, the caller can listen to all or part of the information in his or her own voice (and the voice of the live attendant) at the caller's own pace. Voicemail typically allows the user to replay, pause, rewind a few seconds, and so on, so that listening to a lengthy message filled with information is easier from a voicemail box then when the information is given during the phone call.

If the audio record of the call is delivered to a Website for access, the Web playback of that audio file can likewise include screen-actuated recording functions such as play, stop, pause, and so on. The voice record will be heard either from the speaker associated with the computer used to accessed the Website, or with headphones attached to the computer, as the caller chooses.

If the call record goes into the caller's voicemail box, the voicemail system can either out-dial a call to the caller to listen to the voicemail, or the system can alert the caller with a standard message-waiting indicator signal that the voicemail is in the mailbox. In the latter case, the caller then would have to dial into the voicemail system in the customary manner, to listen to the record of the call.

If the caller desires access by voicemail but lacks an existing voicemail box, the live operator can assign a temporary mailbox to give the caller access to the call record. If the call record is put into a temporary mailbox setup by the information retrieval service, the service (either by the live attendant or by a message announcement) would provide the number and optionally an access code that allows the caller to access information in the temporary mailbox. Alternatively, the system can allow the caller immediate access to the temporary mailbox without having to dial in, if the caller desires and so indicates to the live attendant. The information retrieval service could charge the user to set up and maintain a temporary mailbox, and that temporary mailbox could hold the recorded information for a predetermined period of time after which the caller record would be automatically deleted.

Although the live attendant prompted the caller at 510 for at least one delivery option in the exemplary embodiment described with reference to FIG. 5, providing a delivery option is not an event that need be performed in any particular sequence. For example, a default mode of delivery and a corresponding default address may be chosen by the calling party before beginning the session with the live attendant. In one embodiment, an Interactive Voice Response (IVR) prompts the caller for a delivery destination or address, as well as for the format of the recording (which may include by audio or by text). Selecting the delivery mode and address may also take place after the recording session concludes, by suitable prompts to the caller at that time. Moreover, recording a session with a live attendant may also be initiated by the calling party instead of the attendant, for example, in response to the caller entering a predetermined number sequence on the phone dial keypad in response to an automated or operator prompt. For example, the caller may also be prompted by an IVR, prior to being connected with the operator, to select whether the caller wishes to record the session. The IVR responds to the caller's selection, and if the caller has chosen to have the conversation with the attendant recorded, then the recording may begin once the caller is connected with the attendant. With respect to yet another exemplary feature, prior to connecting the caller with an attendant, the IVR may instruct the caller that he or she can begin recording of a communication session by pushing a number or sequence of numbers using his/her keypad. During the conversation with the attendant, the caller may begin recording of the session by inputting that number or sequence of numbers. Once the system receives the number or sequence of numbers, recording of the session may begin.

The caller-initiated option for recording sessions with a live attendant should benefit both the caller and the provider of the information retrieval system, as the attendant known the session is being recorded for later access by the caller.

In the forgoing description, call routing was discussed in terms of wireline telephones with reference to telephones 21 and 24, illustrated in FIG. 1. It should be understood that calls to and from the voice mail system 65 and the information retrieval system 85 are equally effective to and from the wireless telephones 54 and 55 and to and from the personal digital assistant 60 and 62, illustrated in FIG. 1.

Additionally, any information saved by the calling party in accordance with the present invention, that is directed an electronic mail address or other wireless digital assistant 60, 62 may be routed first through the wireless server 56 for formatting as required for presentation to the calling party at the wireless personal digital assistants 60, 62. Further yet, it should be understood that calls placed by VOIP phones or other VOIP-enabled devices to and from the telecommunications network are effective to obtain the functions and advantages of the invention described herein. In the case of a VOIP-enabled computer, for example, a calling party could be presented with on-screen prompts to initiate recording a session with a live attendant (for example, either before or during the conversation with the attendant), to select the form of the record and the mode of delivery, and for other options associated with recording the session and subsequently accessing the recording.

In yet another embodiment, each conversation with an attendant is recorded as a matter of course. Toward the end of the conversation with the attendant, the attendant may prompt the caller to ask whether he or she would like access a recording of the conversation that had just taken place. The attendance may also ask the user to specify delivery address or destination, as well as a recording format. The destination or address may be an email address, or an Internet location accessible via the Worldwide Web (WWW). The format may be, for example, text or audio. The attendant processes the request of the caller accordingly, for example by entry of his or her responses into the system. After the recording has been delivered, or saved to a location, the caller is able to access the recording. Alternatively, after the conversation with the attendant, the caller may be prompted by the IVR to select whether he or she wishes to have a recording of the conversation sent to him or her. The IVR may also prompt the caller to obtain a destination or address (or to choose his or her default destination if one exists), and may also additionally prompt the caller to obtain a preferred format of the recording (if no default exists, or the caller chooses not to select the default option). The IVR would process the caller's responses accordingly, and the recording may be sent to a caller's email address or saved to a location accessible by the caller via the WWW.

As described herein, a method and system are provided for allowing a calling party to save to a designated memory location information obtained from a network-based voice mail system or from a non network-based information retrieval system for subsequent review by the calling party. It will be apparent to those skilled in the art that various modifications and variations may be made in the present invention without departing from the scope or spirit of the invention. Other embodiments will be apparent to those skilled in the art from consideration of the specification and practice of the invention disclosed herein.

We claim:

1. A method of saving information obtained from a telephony-based information retrieval system, the method comprising:
   receiving a call from a calling party to a called party for voice communication with a live attendant to obtain information;
   initiating voice recording of the communication with the live attendant through an information retrieval system associated with the called party;
   saving an audio file of the voice recording to a designated memory location for subsequent access by the calling party;
   providing at least one information delivery option to the calling party for accessing the voice recording;
   making the memory location available for subsequent access of the saved voice recording by the calling party.
   delivering the audio file to a designated Internet-based web site for subsequent access and playback of the audio file by the calling party, wherein the web site is a default site previously designed for delivery of the audio file; and
   giving the calling party an option to designate a different website, instead of the default site, for delivery of the audio file.

2. A system for saving information obtained from a telephony-based information retrieval system, comprising:
   an information retrieval system associated with a called party and operative:
   to receive a call from a calling party to a called party for voice communication with a live attendant to obtain information;
   to initiate voice recording of the communication with the live attendant through an information retrieval system associated with the called party;
   to save an audio file of the voice recording to a designated memory location for subsequent access by the calling party;
   to provide at least one information delivery option to the calling party for accessing the voice recording;
   to make the memory location available for subsequent accessing of the saved voice recording by the calling party;
   to deliver the audio file to a designated Internet-based web site for subsequent access and playback of the audio file by the calling party, wherein the information retrieval system delivers the audio file to a default web site in response to a previous designation of the default web site for delivery of the audio file; and
   wherein the information retrieval system gives the calling party an option to designate a different web site, instead of the default site, for delivery of the audio file.

3. The method of claim 1, further comprising delivering the audio file to a designated electronic mail address for subsequent access and playback of the audio file by the calling party.

4. The method of claim 1, further comprising preparing a machine translation of the recorded voice communication to produce a text file; and
   making the text file available for subsequent retrieval by the calling party.

5. The method of claim 4, further comprising delivering the text file of the machine translation to a designated electronic mail address for subsequent access by the calling party.

6. The method of claim 4, further comprising delivering the text file of the machine translation to a designated Internet-based web site for subsequent access by the calling party.

7. The method of claim 1, wherein the called party has the option of initiating the voice recording of the communication with the live attendant.

8. The method of claim 1, wherein the calling party has the option of initiating the voice recording of the communication with the attendant.

9. The system of claim 2, wherein the information retrieval system delivers the audio file to a designated electronic mail address for subsequent access and playback of the audio file by the calling party.

10. The system of claim 2, wherein:
   the information retrieval system prepares a machine conversion of the recorded voice communication to produce a text file; and
   makes the text file available for subsequent retrieval by the calling party.

11. The system of claim 10, wherein the information retrieval system delivers the text file of the machine conversion to a designated electronic mail address for subsequent access by the calling party.

12. The system of claim 10, wherein the information retrieval system delivers the text file of the machine conversion to a designated Internet-based web site for subsequent access by the calling party.

13. The system of claim 2, wherein the information retrieval system gives the calling party the option of initiating the voice recording of the communication with the live attendant.

* * * * *